United States Patent [19]
Orita et al.

[11] Patent Number: 5,079,764
[45] Date of Patent: Jan. 7, 1992

[54] OPERATION MODE SETTABLE LAN INTERCONNECTING APPARATUS

[75] Inventors: Kenichiro Orita; Hiroyuki Wada, both of Hadano, Japan

[73] Assignee: Hitachi, Ltd., Tokyo, Japan

[21] Appl. No.: 359,047

[22] Filed: May 30, 1989

[30] Foreign Application Priority Data

May 31, 1988 [JP] Japan ................... 63-131561

[51] Int. Cl.⁵ .............................. H04J 3/02
[52] U.S. Cl. ...................... 370/85.13; 370/85.14
[58] Field of Search ............. 370/85.13, 85.14, 85.1, 370/85.15, 94.1, 94.2, 94.3; 340/825.5, 825.51, 825.05

[56] References Cited

U.S. PATENT DOCUMENTS

| | | | |
|---|---|---|---|
| 4,617,423 | 10/1986 | Dickerson et al. | |
| 4,621,362 | 11/1986 | Sy . | |
| 4,706,081 | 11/1987 | Hart et al. | 370/85.13 |
| 4,707,827 | 11/1987 | Bione et al. | 370/85.13 |
| 4,715,030 | 12/1987 | Koch et al. | 370/85.13 |

Primary Examiner—Benedict V. Safourek
Assistant Examiner—Wellington Chin
Attorney, Agent, or Firm—Fay, Sharpe, Beall, Fagan, Minnich & McKee

[57] ABSTRACT

In a LAN interconnecting apparatus having two transmitting and receiving sections connected to respective LANs, each of the transmitting and receiving sections can be set in either a first or a second operation mode by setting a register. The transmitting and receiving section copies and transfers relayed information frames in the first operation mode, but it does not in the second operation mode. The apparatus makes a unidirectional LAN interconnecting apparatus when one of the transmitting and receiving sections is set in the first operation mode and the other in the second operation mode, while it makes a bidirectional one when both of the transmitting and receiving sections are set in the first operation mode.

13 Claims, 3 Drawing Sheets

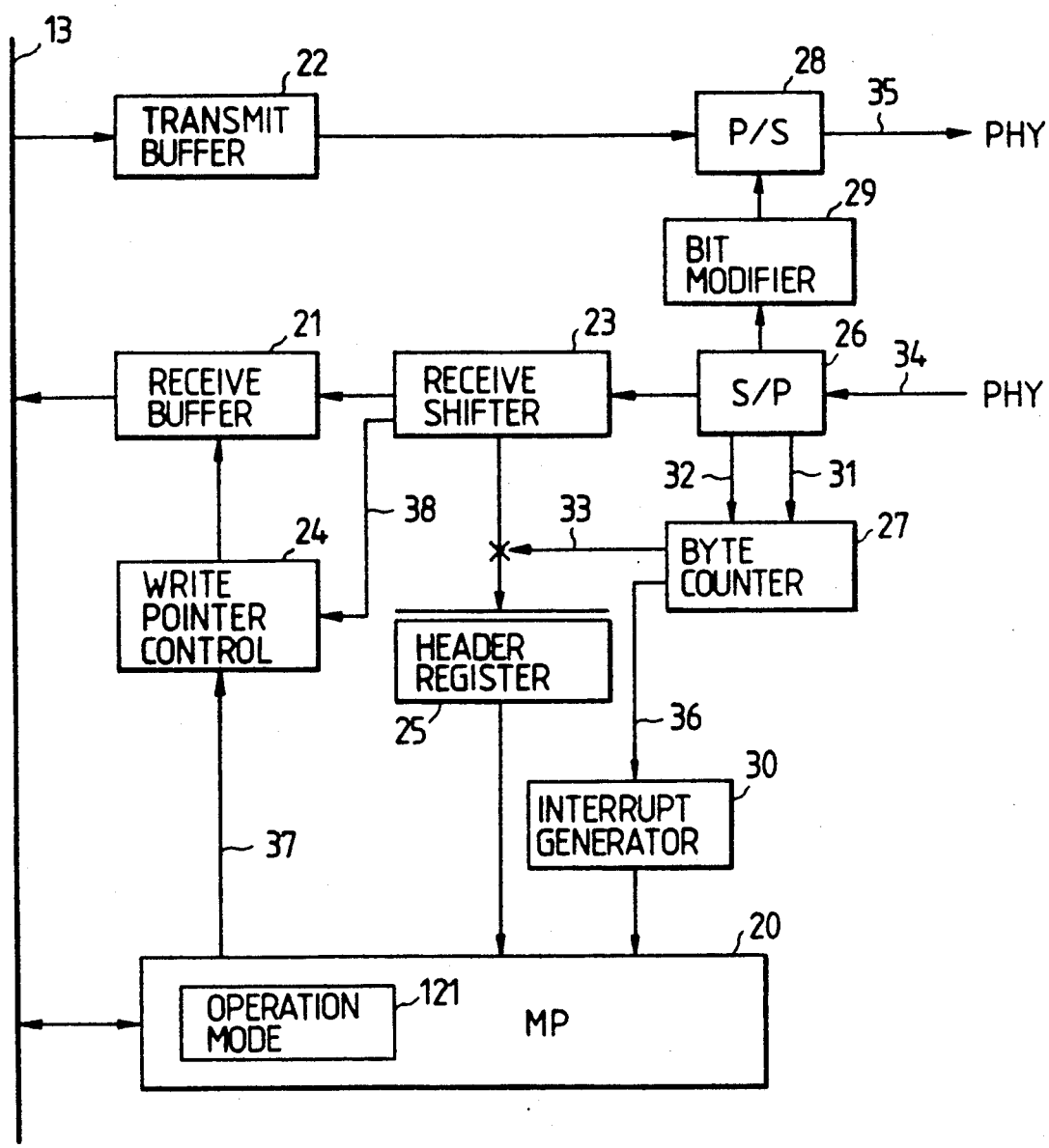

OPERATION MODE SETTABLE LAN INTERCONNECTING APPARATUS

BACKGROUND OF THE INVENTION

The present invention relates to a LAN interconnecting apparatus such as a bridge in a token-ring network for transferring information between LANs.

A conventional LAN interconnecting apparatus such as a bridge operates only in a bidirectional (full duplex) manner. In other words, frames are transferred from one LAN to the other LAN and vice versa. An example of such a conventional LAN interconnecting apparatus is disclosed in U.S. Pat. No. 4,621,362.

When the inter-LAN frame transfer traffic is excessive, some of the frames are lost due to overrun, and the subsequent frequent re-transmitting operations deteriorate the situation. Mere addition of a conventional bidirectional interconnecting apparatus, however, does not effectively ameliorate such a situation. This is because there is no practical mechanism for efficiently distributing the load between the two interconnecting apparatuses. According to U.S. Pat. No. 4,621,362, each frame includes information for identifying one or more bridges through which the frame is to pass and information indicating the order of the bridges for processing the frame. Therefore, if two rings are interconnected by a plurality of parallel bridges, one bridge among these parallel bridges will be designated, thereby enabling a frame to be transferred between the rings without confusion in spite of the presence of the parallel bridges. The above U.S. patent, however, does not teach which bridge should be designated in each frame in order to equalize the load of the parallel bridges.

Various mechanisms could be adopted for distributing load between the bidirectional interconnecting apparatuses. Such mechanisms, however, must be inevitably unsatisfactory in that they result in a considerable increase in the amount of: hardware and/or software, system complication, lack of flexibility, or inefficiency in load distritution.

SUMMARY OF THE INVENTION

Accordingly, it is an object of the present invention to eliminate the above-described problems in the prior art and to provide, without noticeable increase or modification of hardware and software, a LAN interconnecting apparatus which is usable as either a bidirectional interconnecting apparatus or a unidirectional interconnecting apparatus by a simple setting procedure and which is capable of coping with a change in inter-LAN frame transfer traffic with ease and efficiency.

To achieve this aim, a LAN interconnecting apparatus according to the present invention is provided with: a transmitting and receiving section connected to a first LAN, a transmitting and receiving section connected to a second LAN, and a device for setting each of the transmitting and receiving sections in either a first operation mode or a second operation mode. Also provided is a mode control device which permits relayed frames (frames to be transferred between LANs) to be transferred from the transmitting and receiving section in the first operation mode to the other transmitting and receiving section but inhibits the relayed frames from being transferred from the transmitting and receiving section in the second operation mode to the other tranmitting and receiving section.

In a preferred embodiment, each of the transmitting and receiving sections includes a physical control stage for processing signals and a MAC layer control stage for executing frame processing including the copying of relayed frames bound for the other LAN. The mode control device would permit or inhibit the copying of relayed frames in the MAC layer control stage in accordance with the operation mode.

A LAN interconnecting apparatus according to the present invention functions as a bidirectional interconnecting apparatus when both of the two transmitting and receiving sections are set in the first operation mode. On the other hand, when one of the transmitting and receiving sections is set in the first operation mode and the other in the second operation mode, it functions as a unidirectional interconnecting apparatus from the LAN connected to the transmitting an receiving section in the first mode to the other LAN. In addition, switching between these operation modes is very easy. If the permission and inhibition of the frame transfer between the transmitting and receiving sections is embodied as the copying of relayed frames in the MAC layer control stage, redundant processing is reduced to the minimum.

Thus, the present invention facilitates the construction of an interconnecting system which has a capacity fitting the inter-LAN frame transfer traffic. It achieves efficient load distritution between the two interconnecting apparatuses, and makes it easy to cope with both increase and decrease in the inter-LAN frame transfer traffic.

The above and other objects, features and advantages of the present invention will become clear from the following description of the preferred embodiment thereof, taken in conjunction with the accompanying drawings.

BRIEF DESCRIPTION OF THE DRAWINGS

FIG. 2 is a block diagram showing the details of the MAC layer control stage in the bridge shown in FIG. 1.

DESCRIPTION OF THE PREFERRED EMBODIMENT

Figure 1:
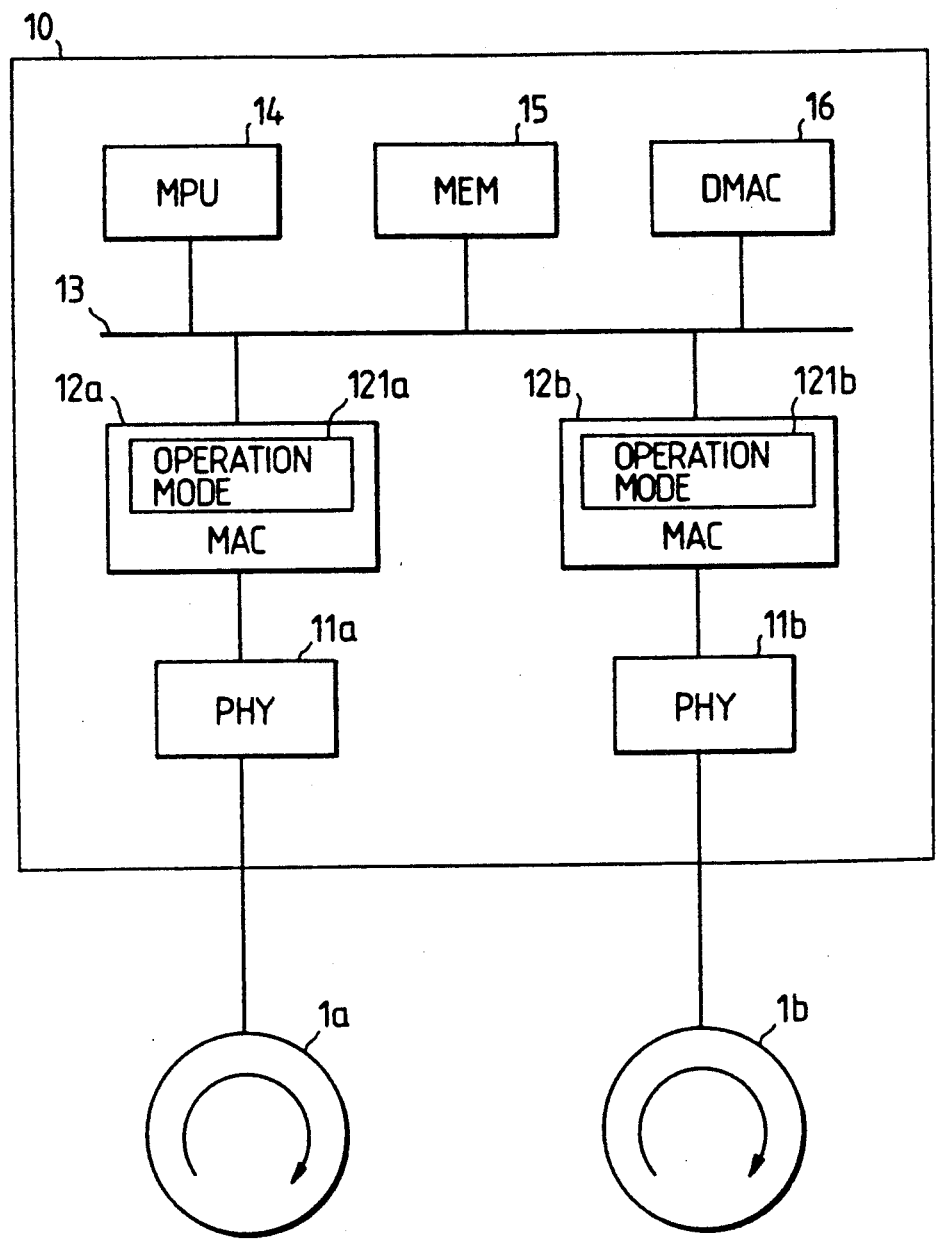
FIG. 1 is a block diagram schematically showing a bridge, which is an embodiment of a LAN interconnecting apparatus according to the present invention.

The present invention adapted to a bridge, namely, a ring interconnecting apparatus for token-ring LANs, will be explained hereinafter with reference to the accompanying drawings. FIG. 1 schematically shows an example of the bridge according to the present invention. A bridge 10 is connected to token rings 1a and 1b, and carries out communications between them in accordance with the protocol of IEEE 802.5 Standard. The bridge 10 includes: physical control stages (PHY) 11a and 11b connected to the rings 1a and 1b, respectively; MAC layer (Media Access Control Layer) stages (MAC) 12a and 12b connected thereto; a microprocessor (MPU) 14; a memory (MEM) 15 and a direct memory access controller (DMAC, hereinafter referred to as "DMA controller") 16. A bus 13 interconnects the MAC layer stages 12a, 12b, the microprocessor 14, the memory 15 and the DMA controller 16.

The physical control stages 11a and 11b encode and decode signals which are transmitted and received between the rings 1a and 1b, detect the abnormality of signals on the rings 1a, 1b, and absorb jitters. The MAC layer control stages 12a and 12b monitor the states of the rings 1a and 1b, respectively, generate tokens and MAC frames to be transmitted for control, and copy (accept) the frames to be processed arriving on the rings. The microprocessor 14: supplies commands to the MAC layer control stages 12a and 12b in accordance with the frame relay control program stored in the memory 15; receives responses therefrom, sets parameters in the DMA controller 16 for the data transfer between the MAC layer control stages 12a, 12b and the memory 15 by direct memory access; and starts the DMA controller 16.

Each of the MAC layer control stages 12a and 12b, like a conventional one, have a function of transmitting the arriving frames received from the physical control stage connected thereto to the downstream of the ring through the physical control stage. This is done without changing the content except for partially modifying it when necessary for acknowledgement. In other words, each of the control stages has: a function of repeating the arriving frame; a function of transferring the arriving frame to the other MAC layer control stage through the memory 15 if the arriving frame is a relayed frame (a frame to be transferred to the other ring, also called a bridge frame); and a function of transmitting the relayed frame transferred from the other MAC layer control stage through the memory 15 to the ring through the physical control stage connected thereto. In the present invention, operation mode registers 121a and 121b are provided in the MAC layer control stages 12a and 12b, respectively. The function of each of the MAC layer control stages (for copying and transferring the relayed frames) is activated or suppressed depending on whether the operation mode set in each of the operation mode registers indicates a first operation mode or a second operation mode, as will be described later in detail. Therefore, when the operation modes of both MAC layer control stages are set in the first mode, the bridge 10 functions as a bidirectional (full duplex) interconnecting apparatus, and when one is set at the first mode and the other at the second mode, the bridge 10 functions as a unidirectional interconnecting apparatus.

FIG. 2 shows the details of the portion of the MAC layer control stage 12 (hereinafter a reference numeral with the subscript a or b omitted represents a pair of elements having the same structure) which is related to the present invention. A serial-parallel converter 26 assembles bit serial signals 34 from the physical control stage 11 into a train of characters, and transmits the train of characters to a receive shifter 23. This is accomplished while generating a delimiter detection signal 31 for indicating the detection of a delimiter at the head of a frame and a character boundary signal 32 which is synchronous with the transmission of each character to the receive shifter 23. A received frame byte counter 27 receives the delimiter detection signal 31 and the character boundary signal 32 and counts the bytes in the received frame. The received frame byte counter also generates a header take-in direction signal 33 and an interrupt start signal 36 when the header portion of the frame has completely entered the receive shifter 23. A header register 25 takes in the header portion of the received frame from the receive shifter 23 when the header take-in signal 33 is generated. The header includes AC (Access Control), FC (Frame Control), DA (Destination Address) and SA (Source Address). The first bit of the SA shows whether or not the frame is a relayed frame. The write pointer control circuit 24: receives a copy command 37 from the microprocessor 20 and a write direction signal 38 from the receive shifter 23; updates a write pointer; and controls the writing operation of a frame receive buffer 21. The write direction signal 38 is generated for each byte when data is transferred from the receive shifter 23 to the frame receive buffer 21.

The microprocessor 20 reads and analyzes the header information from the header register 25. This is in response to the interrupt request generated by an interrupt generator 30 upon reception of the interrupt start signal 36. For the present invention, transfer indication information, i.e. whether or not the first bit of the SA indicates a relayed frame, is judged. The content of the operation mode register 121 is set by a set-up processing and includes a relayed frame copy direction bit. When the relayed frame copy direction bit is "1" and the frame is judged to be a relayed frame as a result of the header analysis, the microprocessor 20 generates the copy command 37. This will write the received frame into the frame receive buffer 21 (copy the received frame) and then request the DMA controller 16 to start so as to transfer the content of the frame receive buffer 21 to the memory 15. On the other hand, when the relayed frame copy direction bit is "0", the microprocessor 20 does not generate the copy command 37 even if the frame is judged to be a relayed frame as a result of the header analysis. The received frame is therefore discarded, i.e. not written into the frame receive buffer 21 and hence not transferred to the other ring, only the repeating operation to the downstream of the same ring is executed.

The repeating operation is executed through the serial-parallel converter 34, a bit modifier 29 and a parallel-serial converter 28. The bit modifier 29 modifies the bits (A bit, C bit) for acknowledgement if the frame being repeated is a frame to be processed by this bridge. The relayed frame transferred from the other MAC layer control stage through the memory 15 is received by a frame transmit buffer 22 and transmitted to the physical control stage (PHY) 11 through the parallel-serial converter 28.

The overall operation of the MAC layer control stage shown in FIG. 2 will be briefly described. When a frame starting delimiter is detected in the data received from the ring 1, the received frame byte counter 27 starts to count the bytes, and when the header portion enters the receive shifter 23, the received frame byte counter 27 generates the header take-in direction signal 33. In response to the signal 33, the header information in the receive shifter 23 is transferred to the header register 25.

The microprocessor 20 reads and analyzes the transfer indication information in the header register 25 in response to the interrupt request from the interrupt generator 30. When the result shows that the frame is a relayed frame destined for the other ring, the relayed frame is transferred to the memory 15 through the frame receive buffer 21, if the relayed frame copy direction bit is "1". When the relayed frame copy direction bit is "0", the relayed frame is not written into the frame receive buffer 21 and hence it is not transferred to the other MAC layer control stage even if it is a relayed frame destined for the other ring.

Figure 3A:
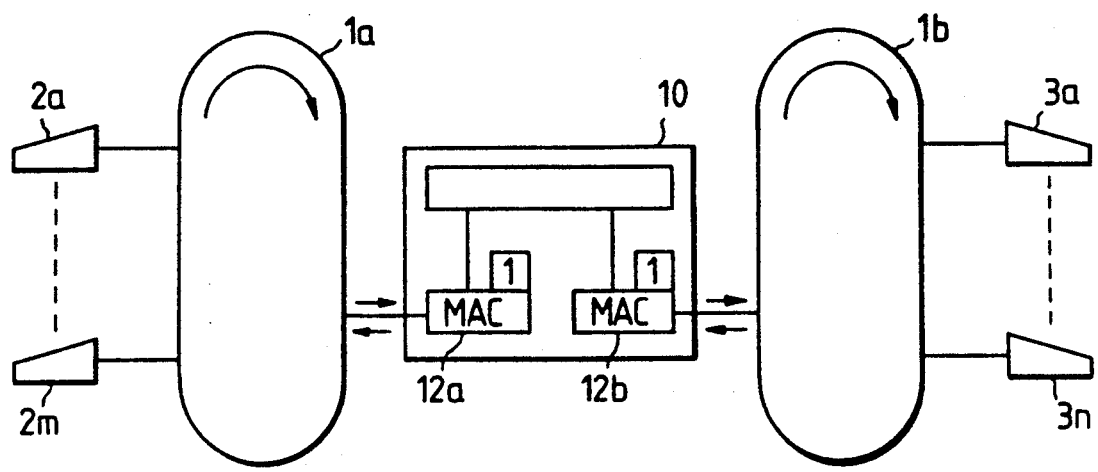
FIGS. 3A and 3B are block diagrams showing example of the ring network formed by interconnecting rings by the bridge shown in FIG. 1.

Examples of adaptation of the bridge by setting the operation mode will be explained with reference to FIGS. 3A and 3B. If the numbers of stations 2a to 2m and stations 3a to 3n are not so large and hence the frame transfer traffic between the rings 1a and 1b is not so large at the time when the rings 1a and 1b are connected with each other for the first time, a single bridge 10 may be installed with its relayed frame copy direction bits in both MAC layer control stages 12a and 12b set to "1", as shown in FIG. 3A. In this state, the bridge 10 functions as a bidirectional interconnecting apparatus and transfers frames from the ring 1a to the ring 1b and vice versa in a full duplex manner as a conventional apparatus.

Figure 3B:
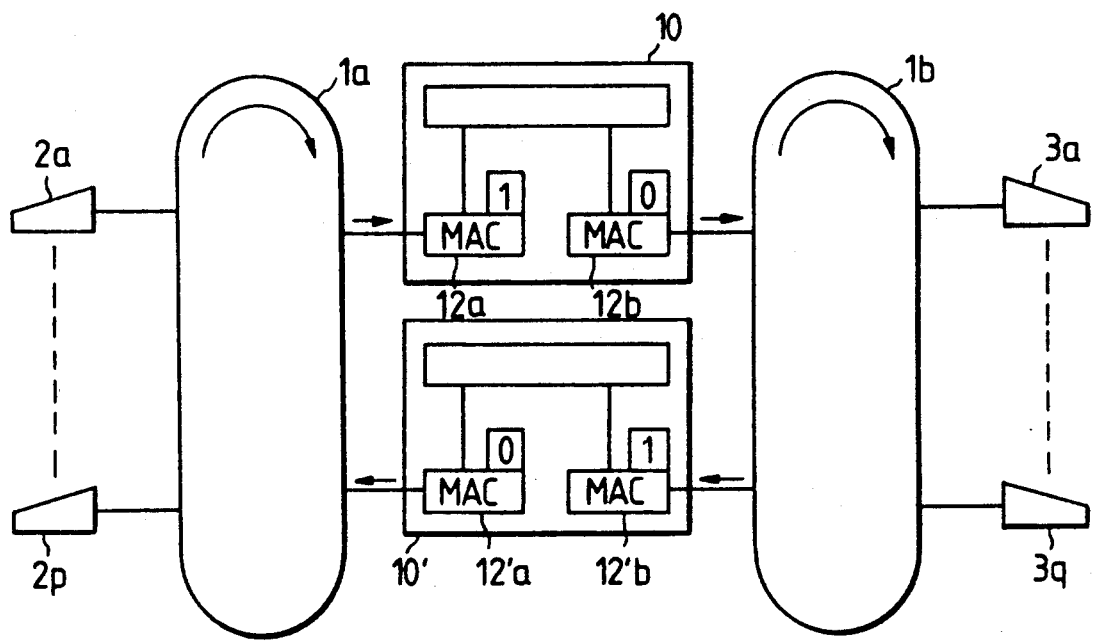

As the numbers of stations 2a to 2p and stations 3a to 3q increase the frame transfer traffic between the rings increases, as shown in FIG. 3B. It then becomes impossible to process frames satisfactorily by the single bidirectional bridge 10. Another bridge 10' is therefore added and the relayed frame copy direction bit in its MAC layer control stage 12'a on the ring 1a side is set to "0". The relayed frame copy direction bit in its MAC layer control stage 12'b on the ring 1b side is set to "1". Simultaneously the relayed frame copy direction bit in the MAC layer control stage 12b on the ring 1b side of the bridge 10 is changed to "0".

In this state, among the frames travelling on the ring 1a, the relayed frames to be transferred to the other ring are copied (accepted) by the MAC layer control stage 12a in the bridge 10, fed to the other MAC layer control stage 12b through the common control section (14 to 16 in FIG. 1), and transferred to the ring 1b. However, the relayed frames to the other ring travelling on the ring 1b are not copied (accepted) by the MAC layer control stage 12b in the bridge 10. Therefore, only the transfer from the ring 1a to the ring 1b is possible in the bridge 10. In contrast, in the bridge 10', only the transfer from the ring 1b to the ring 1a is possible. In this way, both the bridges 10 and 10' can apply themselves to unidirectional inter-ring transfer, thereby processing the increased inter-ring transfer traffic without confusion.

Conversely, it is also possible to change the configuration of the network shown in FIG. 3B to the configuration of the network shown in FIG. 3A in accordance with a decrease in the inter-ring transfer traffic.

In the above-described embodiment, the permission and inhibition of the transfer of a relayed frame is embodied as the permission and inhibition of the writing (copying) of the relayed frame to the frame receive buffer in the MAC layer control stage. This arrangement is considered to be the best from the point of view of reducing the load of the apparatus to the minimum. There is, however, substantially no problem in embodying it as the permission and inhibition of the processing at another stage. For example, it may be embodied as the permission and inhibition of the transfer from the frame receive buffer 21 to the common memory 15, or as the permission and inhibition of the transfer from the common memory 15 to the frame transmit buffer 22 in the other MAC layer control stage.

The present invention is also applicable to an interconnecting apparatus for a LAN of a type other than a token-ring type.

While there has been described what is at present considered to be a preferred embodiment of the invention, it will be understood that various modifications may be made thereto, and it is intended that the appended claims cover all such modifications as fall within the true spirit and scope of the invention.

What is claimed is:

1. A LAN interconnecting apparatus comprising:
a first and a second transmitting and receiving sections connected to a first and a second LAN, respectively, for transmitting and receiving information frames to and from said first and said second LAN;
means interconnecting said first and second transmitting and receiving sections for selectively transferring therebetween relayed frames containing transfer indication information which indicates a need for frame transfer between said first and second LANs;
mode setting means for selectively setting each of said first and second transmitting and receiving sections in either a first operation mode or a second operation mode; and
mode control means for permitting said relayed frames to be transferred from any one of said first and second transmitting and receiving sections in said first operation mode to an other of said first and second transmitting and receiving sections, and inhibiting said relayed frames from being transferred from the any one of said first and second transmitting and receiving sections in said second operation mode to the other of said first and second transmitting and receiving sections and wherein said inhibiting is effected regardless of said transfer indication information contained within the relayed frames.

2. A LAN interconnecting apparatus as claimed in claim 1, wherein each of said first and second transmitting and receiving sections includes a physical control stage for processing signals transmitted to and received from the LAN connected thereto and a MAC layer control stage for executing frame processing including copying of the relayed frames bound for the other LAN, said mode control means permits said MAC layer control stage to copy or inhibits said MAC layer from copying said relayed frames in accordance with said operation mode.

3. A LAN interconnecting apparatus as claimed in claim 2, wherein said MAC layer control stage includes a frame receive buffer for temporarily storing said relayed frames from said physical control stage, and said mode control means permits said relayed frames to be written or inhibits said relayed frames from being written into said frame receive buffer in accordance with said operation mode.

4. A LAN interconnecting apparatus as claimed in claim 3, wherein said mode control means includes a processor in said MAC layer control stage, and said mode setting means includes a register for storing mode information which indicates said operation mode and controls said processor.

5. A LAN interconnecting system for transferring relayed frames which are information frames to be transferred between LANs, said relayed frames containing transfer indication information which indicates a need for frame transfer between LANs, comprising:
a first and a second LAN for enabling communication among computing stations;
a first and a second LAN interconnecting apparatuses respectively connected to said first and second LANs and each including a means for setting a transfer condition as either a bidirectional transfer condition or a unidirectional transfer condition;

said first LAN interconnecting apparatus, while optionally set in said unidirectional transfer condition, having means for transferring said relayed frames from said first LAN to said second LAN and for inhibiting transfer of said information frames from said second LAN to said first LAN;

said second LAN interconnecting apparatus, while optionally set in said unidirectional transfer condition, having means for transferring said relayed frames only from said second LAN to said first LAN and for inhibiting transfer of said information frames from said first LAN to said second LAN;

whereby said LAN interconnecting system functions bidirectionally when both the first and second LAN apparatuses are set in the unidirectional transfer condition.

6. A LAN interconnecting system as claimed in claim 5, wherein each of said first and second LAN interconnecting apparatuses comprises:

a first and a second transmitting and receiving section connected to said first and said second LAN, respectively, for selectively transmitting and receiving information frames to and from said first and said second LAN;

means interconnecting said first and second transmitting and receiving sections for transferring said relayed frames between said sections;

mode setting means for setting each of said first and second transmitting and receiving sections in either a first operation mode or a second operation mode;

mode control means which permits said relayed frames to be transferred from said first transmitting and receiving section in said first operation mode to said second transmitting and receiving section in said first or said second operation mode, but inhibits said relayed frames from being transferred from said second transmitting and receiving section in said second operation mode to said first transmitting and receiving section in said first or said second operation mode;

said mode setting means of said first LAN interconnecting apparatus optionally setting the related first transmitting and receiving section in said first operation mode and optionally setting the related second transmitting and receiving section in said second operation mode; and said mode setting means of said second LAN interconnecting apparatus optionally setting the related first transmitting and receiving section in said second operation mode and optionally setting the related second transmitting and receiving section in said first operation mode.

7. A LAN interconnecting apparatus for selectively transferring an information frame between a first and a second LAN independently and in operative conjunction with an other LAN interconnecting apparatus comprising:

a common memory for storing a frame relay control program and for providing temporary storage of said information frame;

a microprocessor for determining a transmissibility of said information frame based upon information contained within said information frame in accordance with the frame relay control program stored in the common memory;

a direct memory access controller for providing direct access of the information frame to the common memory;

a pair of transmitting and receiving sections each connected to a respective LAN and in operative communication with said microprocessor for transmitting and receiving the information frame to and from each respective LAN based upon the information contained within the information frame;

means for transferring said information frame as a relayed frame to and from said pair of transmitting and receiving sections;

mode setting means for selectively setting a status of each transmitting and receiving section in either a unidirectional operation mode or a bidirectional operation mode; and, wherein said transmitting and receiving sections discard the information frame received from the LAN when the section is designated by said status to transmit unidirectionally opposite to a selected transfer direction of the information frame, and said section transfers the frame when said status designates to transmit unidirectionally in the selected transfer direction of the information frame.

8. A method for distributing transfer traffic between first and second interconnecting LAN bridge apparatuses in a LAN interconnecting system, said transfer traffic including information frames comprising bridge designation information including a bridge designator address, each of said bridge apparatuses addressed by said bridge designation address, and wherein the apparatuses comprise a first and a second transmitting and receiving section connected to a first and a second LAN, each of said bridge apparatuses additionally comprising a mode setter to set each bridge apparatus in either a bidirectional or a unidirectional mode, said method comprising the steps of:

setting said first bridge apparatus from a bidirectional mode to a unidirectional mode;

designating said second bridge apparatus with the bridge designation address of said first bridge apparatus; and, setting said second bridge apparatus in a unidirectional mode directionally opposite to said first bridge apparatus.

9. A method for distributing transfer traffic between first and second interconnecting LAN bridge apparatuses in a LAN interconnecting system, said transfer traffic comprising information frames including bridge designation information including a bridge designation address, each of said bridge apparatuses addressed by said bridge designation address, and wherein the system is comprised of a mode setter for setting either a bidirectional or a unidirectional mode setting, said bridge apparatuses additionally comprising a first and a second transmitting and receiving section, said method embodied in each bridge apparatus comprising the steps:

setting by the mode setter of said bridge apparatus in a unidirectional mode for allowing transmission of the information frames from a first LAN ring to a second LAN ring and inhibiting transmission of the information frames from the second LAN ring to the first LAN ring based on the mode set;

receiving information frames from the first LAN ring in a first transmitting and receiving section of the bridge apparatus;

determining if said information frame is a relayed information frame designated for transmission to the second LAN ring through said bridge apparatus based upon the bridge designation information;

discarding said information frame if it is not a relayed information frame;

verifying that transmissibility is in accordance with the mode setting;

copying said relayed frame from said first transmitting and receiving section to said second transmitting and receiving section; and, outputting said relayed frame from said second transmitting and receiving section to said second LAN ring.

10. The method according to claim 9 further comprising the steps of:

receiving information frames from a second LAN ring in a second transmitting and receiving section of the bridge apparatus;

determining if said information frame is a relayed information frame designated for transmission to the first LAN ring through said bridge apparatus based upon the bridge designation information;

discarding said information frame if it is not the relayed information frame;

verifying that transmissibility is in accordance with the mode setting; and, discarding said relayed information frame for having a transfer direction opposite with said mode setting.

11. The method according to claim 10 wherein all discarding steps further comprise the step of:

outputting the information frame onto a LAN ring of original generation.

12. A LAN interconnecting apparatus as claimed in claim 4, further comprising:

memory means connected to each MAC layer control stage of said first and said second transmitting and receiving sections for retrievably storing said relayed frames;

wherein said mode control means selectively permits said relayed frames to be written to or inhibits said relayed frames from being read from said memory means in accordance with said operation mode.

13. A LAN interconnecting apparatus as claimed in claim 12 further comprising:

converter means contained within said MAC layer control stage for converting said information frame into a bit serial train of characters;

a header register connected to said converter means for storing a header portion of said bit serial train indicating whether said information frame is a relayed frame;

wherein said processor analyzes said header register and said mode information storage register to execute transmissibility of said information frame as a relayed frame.

* * * * *